Sept. 1, 1959    F. H. WILEY ET AL    2,902,105
SAFETY DEVICE FOR ELECTRIC LIFT TRUCK
Filed March 26, 1958
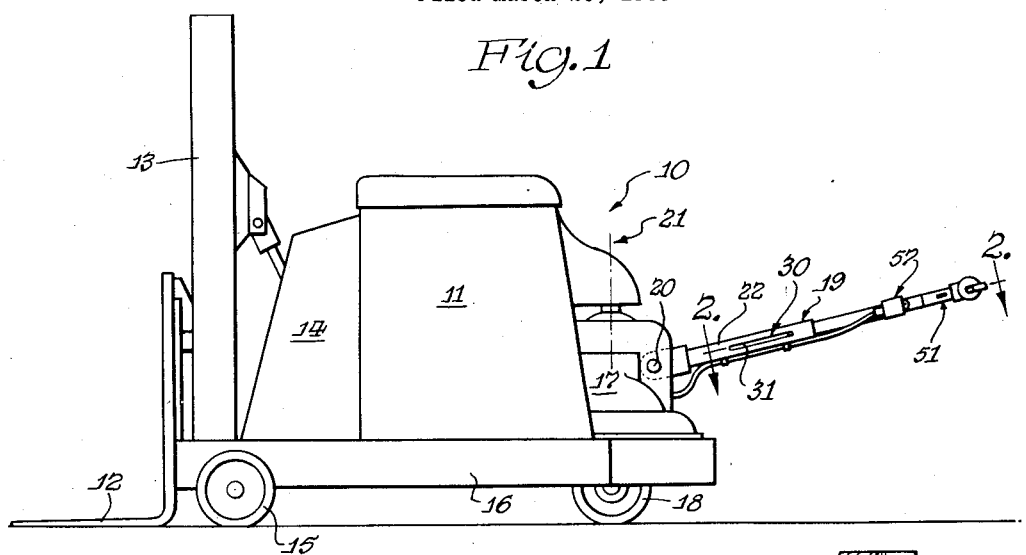
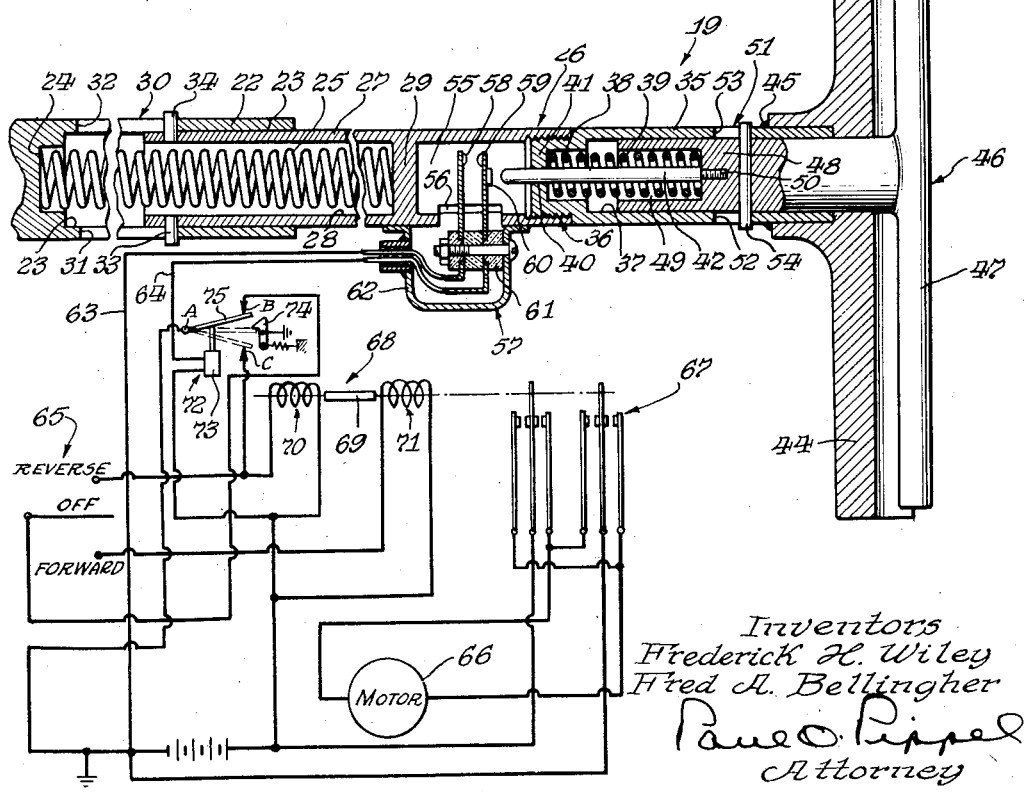
Inventors
Frederick H. Wiley
Fred A. Bellingher
Paul O. Pippel
Attorney United States Patent Office 2,902,105
Patented Sept. 1, 1959

2,902,105
SAFETY DEVICE FOR ELECTRIC LIFT TRUCK

Frederick H. Wiley, Palos Heights, and Fred A. Bellingher, Alsip, Ill., assignors to International Harvester Company, Chicago, Ill., a corporation of New Jersey Application March 26, 1958, Serial No. 724,171

5 Claims. (Cl. 180—82)

The invention relates to a safety device for eliminating a hazard to an operator of an electric motor driven lift truck. More in particular this invention relates to a collapsible steering control lever for an electrically driven industrial type hand truck wherein means are provided for automatically reversing the direction of a propelling motor when the control lever engages an object during forward movement.

Numerous industries employ electric battery powered lift trucks for moving equipment and materials from one place to another. One type of commonly used industrial trucks requires that the operator steer the truck manually by manipulation of a steering lever while walking adjacent the truck. The steering lever of this latter type is usually provided with control switches for selectively raising and lowering of a lift mechanism and for moving the vehicle under power in forward or reverse direction. These latter type trucks usually are designed to move at speeds compatible to average walking speeds. Oftentimes the operator will walk ahead of the vehicle with at least one hand on the steering control lever. Sometimes, for example, when maneuvering the vehicle in close quarters, adjacent walls or corners, the operator may inadvertently or accidently be positioned between the steering lever and a wall. Now in such instance if the vehicle is moving in a forward direction, the operator may become wedged between the wall and steering lever and even though he succeeds in shutting off the power, he may be seriously or even fatally injured because the momentum of the vehicle may drive the lever into his trapped body. This invention has for its prime object a steering control lever for such trucks which prevents injury to an operator.

A further object of this invention is to provide a steering control lever which is resiliently colapsible.

A still further object of this invention is to provide a steering control lever telescopically retractable.

Another object of this invention is to provide a steering control lever which has a safety switch for automatically reversing the direction of the vehicle when the lever engages a resistance to forward movement.

These and other important and desirable objects inherent and encompassed by the invention are further evident in the ensuing description of a preferred embodiment, the appended claims and the annexed drawings wherein:

Figure 1 is a side elevation of an industrial type electrically driven lift truck having a steering control lever according to this invention; and Figure 2 is a plan view, in section, taken on the line 2—2 of Figure 1 illustrating the detail construction of the control lever of this invention, and a schematic diagram of an electric circuit adapted to cooperate with an electric safety switch in the control lever.

Referring to Figure 1 of the drawings, the numeral 10 indicates generally a reversible electric motor driven hand truck or industrial lift truck embodying the present invention. The truck 10 is powered by electric storage batteries in a battery compartment 11. The rearward portion of the truck 10 is provided with a lifting platform or tongue 12 which may be raised or lowered by power from the batteries by the conventional vertical standard 13 and power lift mechanism indicated generally at 14. For rearward stabilizing support the truck 10 is provided with a plurality of conventional wheels, one of which is shown at 15, mounted rotatably to the frame 16. The forward portion of the truck 10 is provided with a traction power mechanism 17 comprising a conventional electric motor mounted for vertical pivotal movement about the axis 21 with reference to the frame 16 and drivingly connected to at least one steerable traction wheel 18. The operational control of the vehicle 10 is by means of a steering control lever 19 pivotally connected at 20 to the power traction mechanism 17. Thus arcuately moving the steering control lever 19 in a generally horizontal direction moves the mechanism 17 and its associated traction wheel 18 about the vertical axis 21 to control the direction of travel of the truck 10 in a conventional manner.

Generally the steering control lever 19 is provided with a first switch (not shown) adapted to energize the lift mechanism 14 for selectively raising or lowering the platform 12. A second or operating switch (not shown) is also provided on the lever 19 for energizing the traction mechanism 17 selectively in a forward or reverse direction.

Referring now to Figure 2, this invention resides mainly in the construction of a steering control lever 19. The lever 19 may conveniently be comprised of a rearward member 22, one end of which is connected pivotally at 20 to the power traction mechanism 17 in a conventional steering relation. The other or forward end portion of the member 22 is provided with a longitudinally disposed first bore 23. The rearward end of the bore 23 may conveniently be provided with a recess 24 adapted to seat one end of a captive first helical spring 25. A forward member generally indicated at 26 is provided having its rearward end portion 27 adapted to fit slidably in telescopic relation within the bore 23 of the member 22. The rearward end portion 27 of the member 26 is provided with a longitudinally disposed second bore 28 adapted to receive at least a portion of the spring 25 as shown in Figure 2. The forward end of the spring 25 may conveniently be seated on a wall section 29 of the member 26. From this it can be seen that the spring 25 being under compression urges the member 26 forwardly in shock absorbing relation with respect to the rearward member 22.

Now in order to prevent the spring 25 from ejecting the member 26 from the bore 23 of the rearward member 22 a stop means generally indicated at 30 is provided. The stop means 30 may conveniently be comprised of a pair of slots 31 and 32 longitudinally disposed in parallel relation in the member 22 as shown best in Figure 2. Positioned in slidable relation in the slots 31 and 32 are, respectively, a pair of pins 33 and 34. The pins 33 and 34 are rigidly connected to the rearward end portion 27 of the member 26. Thus the member 26 may extend or recede into the bore 23 to the limits imposed by the longitudinal length of the slots 31 and 32.

Principally for manufacturing and assembling reasons the member 26 may be comprised of two sections, the rearward end portion 27 and the forward end portion 35 connected rigidly together by threads indicated at 36. The forward end portion 35 is provided with a longitudinally disposed third bore 37 having a small recess 38 adapted to receive one end of a second captive helical spring 39. Also in the portion 35 of the member 26 is a longitudinally disposed hole 40 in the wall 41 adapted to receive in slidable relation a rod 42.

The forward end portion 35 of the member 26 extends laterally to form integrally connected handle grips 43 and 44 through weld at 45. Thus the operator by manipulation of the handles 43 and 44 may steer the vehicle 10 through the lever 19.

Slidably fitted in the third bore 37 is a switch operating element generally indicated at 46. The element 46 projects forwardly of the handle grips 43 and 44 and is provided with a bumper 47 in parallel relation with the grips 43 and 44 as shown in Figure 2. The shank portion 48 of the element 46 is telescopically fitted into the bore 37 in slidable relation. The shank 48 is provided with a recess 49 in axial alinement with the recess 38. The recess 49 also provides a seat for the other end of the second captive spring 39 as illustrated in Figure 2. Thus it can readily be seen that the second captive helical spring 39 urges the switch operating element 46 in a forward direction with reference to the forward end portion 35 of the member 26. The rod 42 is rigidly connected to the element 46 by a conventional thread connection at 50 in the shank 48.

In order to prevent the helical spring 39 from ejecting the element 46 a second stop means generally indicated at 51 is provided. The stop 51 may be comprised of a pair of slots 52 and 53 longitudinally disposed in parallel relation in the portion 35 of the member 26. Positioned in slidable relation in the slots 52 and 53 is a laterally disposed pin 54 rigidly connected to the shank 48 of the element 46. From this it can be seen that the switch operating element 46 may extend or recede into the bore 37 to the limits imposed by the longitudinal length of the slots 52 and 53.

Between the walls 29 and 41 of the member 26 is a hollow section or chamber 55 with an opening 56. A single-pole single-throw electric safety switch generally indicated at 57 is mounted on the member 26 with its contacts protruding into the chamber 55. One of the contacts 58 is stationary while the other contact 59 is movable so that the contact 59 may engage the contact 58 in electric circuit closing relation. The movable contact 59 is provided with an electrically insulated seat 60 positioned for engagement with the rod 42. Thus an inward movement of the switch operating element 46 with respect to the member 26 engages the rod 42 with the seat 60 to close the contacts 58 and 59.

The contacts 58 and 59 of the safety switch 57 are mounted on an insulated pile-up 61 which in turn is mounted on a housing 62 in a conventional manner. The housing in turn is mounted on the member 26 in rigid relation such as by screws (not shown). The contact 58 is connected to the conductor lead 63 and the contact 59 is connected to the conductor lead 64 as shown in Figure 2.

Referring now to the schematic electrical circuit shown in Figure 2, it will be seen that the circuit may conveniently be comprised of a battery, an operating control switch 65 having a neutral, forward and reverse position for controlling the motor 66 of the power traction mechanism 17, a solenoid operated double-pole double-throw motor switch 67 for selectively connecting the motor 66 with the battery power source for either forward or reverse direction or disconnect to deenergize the motor 66, a double coil solenoid 68 having a single plunger 69 adapted to operate the motor switch 67, one coil 70 of the solenoid 68 positioned to actuate the plunger 69 in one direction for operating the motor switch 67 from a neutral or open circuit position to a position for energizing the motor 66 in reverse direction and the other coil 71 of the solenoid 68 positioned to actuate the plunger 69 in the other direction for operating the motor switch 67 from a neutral or open circuit position to a position for energizing the motor 66 in forward direction. The circuit also includes a standard relay single-pole double-throw switch 72 having a coil 73 and a manually releasable latch 74, and a safety switch 57. The armature 75 of the relay 72 is spring-biased so that contact is normally established from lead A to lead B when the coil 73 is not energized. When the coil 73 is energized the normal contact between lead A and lead B is terminated and contact between lead A and lead C is then established because the armature 75 is drawn downward as shown in dotted lines in Figure 2. Thereafter when the coil 73 becomes deenergized the armature 75, being spring-biased, tends to reestablish the connection between leads A and B. However, such return movement of the armature 75 is arrested by the latch 74 whereby the lead A is not connected with either lead B or lead C. The latch 74 also being spring-biased must be manually released in order to reestablish connection between lead A and lead B.

Having thus described the construction details of this invention, we now discuss the operation thereof.

*Operation*

During normal or conventional operation of the vehicle 10, the operator grasps the handles 43 and 44 and using a thumb or finger manipulates the operating control switch 65. Thus he may energize the motor 66 of the power traction mechanism 17 in either a forward or reverse direction or he may deenergize the motor 66. Also during movement of the truck 10 lateral movement of the steering control lever 19 effects steering in a conventional manner.

During normal operation, when the operating control switch 65 is moved to "forward" position the coil 71 of the solenoid 68 is energized causing the plunger 69 to move rightwardly which in turn closes the switch 67 to connect the motor 66 with the battery for forward movement of the truck 10. Conversely, if the operating control switch 65 is moved to "reverse" position the coil 70 of the solenoid 68 is energized causing the plunger 69 to move leftwardly, which in turn closes the switch 67 to connect the motor 66 with the battery for reverse movement of the truck 10. When the operating control lever 65 is in the "off" or neutral position neither of the coils 70 or 71 is energized, and being that the plunger 69 is spring-biased to a neutral position the switch 67 assumes an open circuit position as illustrated in Figure 2.

Now suppose that the operator is moving the truck 10 in a forward direction during normal operation. Should the operator inadvertently or accidentally be positioned between a stationary object, such as a wall or pillar, and the front of the handles 43 and 44 of the steering control lever 19, the truck 10 would tend to drive the lever 19 forwardly, thereby pressing or squeezing the body of the operator. Now if the conventional type steering lever is employed, the lever would not collapse or telescope and thus even if the power of the motor 66 is shut off the momentum of the truck 10 may seriously or fatally injure the operator. In the present invention such injury is avoided because the bumper 47 of the safety switch operating element 46 compresses the spring 39 to move the rod 42 into engagement with the seat 60, thus closing the normally open safety switch 57. When the safety switch 57 closes, the coil 73 of the relay 72 becomes energized, which in turn terminates the contact between leads A and B and immediately establishes connection between leads A and C. This change at once terminates the operability of the control switch 65 and at the same time energizes the coil 70 of the solenoid 68. Energizing of the coil 70 moves the plunger 69 leftwardly, thus closing the motor switch 67 for energizing the motor 66 in reverse direction. The motor 66 now urges movement of the truck 10 in reverse direction. Owing to the fact that momentarily the truck 10 will move forwardly due to its momentum until the motor 66 is able to effect reverse movement of the truck, the lever 19 collapses by telescopic movement of the member 26 into the member 22 thereby compressing the spring 25. Before the limit of the telescoping action of the lever 19 has been reached the motor 66 will have succeeded in moving the truck 10 in reverse direction.

When the truck 10 has moved reversely so that the springs 25 and 39 have expanded to their normal position the safety switch 57 will open thus deenergizing the coil 73 of the relay 72. This releases the spring-biased armature 75 which tends to reestablish the connection between leads A and B. However, such movement of the armature 75 is arrested by the spring-biased latch 74, thus resulting in resolving leads A, B and C in open circuit relation. To establish the connection between leads A and B requires manual resetting of the relay 72 by releasing the spring-biased latch 74.

From the foregoing it should now be apparent that if the operator becomes wedged between the lever 19 and a stationary object the first feature of this invention is the immediate reversal of the motor 66 in the power traction mechanism 17, and the second feature is the further telescoping of the lever 19 by compressing the spring 25 to offset a further forward movement of the vehicle 10 until the motor 66 is able to overcome the momentum of the vehicle and cause movement in a reverse direction.

It should be pointed out that the spring 39 should be of smaller capacity than the spring 25. However, the capacity of the spring 39 should be great enough to discourage the operator from using the safety switch 57 as a control switch. The spring 25, on the other hand, should have greater capacity than that of the spring 39, but not great enough to injure the operator in the event the telescoping or collapsing of the lever 19 is necessary as a safety measure.

Having thus described a preferred embodiment of the invention, it can now be seen that the objects of the invention have been fully achieved and that it must be understood that changes and modifications may be made which do not depart from the spirit of the invention nor from the scope thereof as defined in the appended claims.

What is claimed is:

1. For a reversible electric motor driven hand truck of the kind described, a manually operable steering safety control lever comprising a rearward member pivotally connected to said truck in steering relation, a first bore disposed longitudinally in the forward end portion of said rearward member, a forward member, the rearward portion of said forward member being adapted for slidable longitudinal telescopic movement in said first bore, a second bore disposed longitudinally in the rearward portion of said forward member, said second bore being positioned in axial alinement with said first bore, a captive spring disposed longitudinally in said second bore and extending into said first bore for urging said forward member forwardly of said rearward member, stop means positioned to limit forward movement of said forward member with respect to said rearward member, a spring biased normally open electric safety switch mounted on said forward member, a longitudinally movable switch operating element mounted on said forward member, one end of said element projecting forwardly of said lever and the other end positioned in engageable relation with said switch, resilient means mounted on said forward member positioned to urge said element in a forward direction with respect to said forward member, and an electric safety circuit adapted to energize said motor for driving said truck in reverse direction when said operating element is moved in a rearward direction with respect to said forward member for closing said safety switch.

2. For a reversible electric motor driven hand truck of the kind described, a manually operable steering safety control lever comprising an elongated rearward member pivotally connected to said truck in steering relation, an elongated forward member mounted on said rearward member in retractable telescopic relation, a first resilient means mounted in said lever positioned to absorb shock during retractive movement of said forward member with respect to said rearward member, a normally open electric safety switch mounted on one of said members, a switch operating element mounted on said forward member, one end of said element projecting forwardly of said lever and the other end positioned in engageable relation with said switch, a second resilient means mounted on one of said members positioned to urge said operating element forwardly, and an electric safety circuit adapted to energize said motor in reverse direction when said operating element is moved in a rearward direction with respect to said forward member for closing said safety switch.

3. For a reversible electric motor driven hand truck of the kind described, a manually operable steering control lever yieldably retractable in a longitudinal direction having a normally open electric safety switch mounted thereon, said switch being positioned to close upon retraction of said lever, and an electric safety circuit adapted to energize said motor in reverse direction when said switch is in closed position.

4. For a reversible electric motor driven hand truck of the kind described, a manually operable retractable steering control lever comprising an elongated rearward member connected to said truck in pivotal steering relation, an elongated forward member mounted on said rearward member in retractable telescopic relation, a first resilient means mounted in said lever positioned to absorb shock during retractive movement of said forward member with respect to said rearward member, a normally open electric safety switch mounted on said forward member, a switch operating element mounted on said forward member, one end of said element projecting forwardly of said lever and the other end positioned in engageable relation with said switch, a second resilient means mounted in said forward member positioned to urge said operating element forwardly, and an electric safety circuit adapted to energize said motor in reverse direction when said operating element is moved in a rearward direction with respect to said forward member for closing said safety switch.

5. For a reversible electric motor driven hand truck of the kind described, a manually operable retractable steering control lever comprising an elongated rearward member connected to said truck in pivotal steering relation, an elongated forward member mounted on said rearward member in retractable telescopic relation, a first helical spring mounted in said lever positioned to absorb shock during retractive movement of said forward member with respect to said rearward member, a normally open electric safety switch mounted on said forward member, a switch operating element mounted on said forward member, one end of said element projecting forwardly of said lever and the other end positioned in engageable relation with said switch, a second helical spring mounted in said forward member positioned to urge said operating element forwardly, said second helical spring being smaller than said first helical spring, and an electric safety circuit adapted to energize said motor in reverse direction when said operating element is moved in a rearward direction with respect to said forward member for closing said safety switch.

References Cited in the file of this patent

UNITED STATES PATENTS

| 2,254,331 | Stuebing | Sept. 2, 1941 |
| 2,588,664 | Schreck | Mar. 11, 1952 |